US012091642B1

(12) United States Patent
Nash et al.

(10) Patent No.: US 12,091,642 B1
(45) Date of Patent: Sep. 17, 2024

(54) IRON, RUST, AND METALLIC DEPOSIT REMOVAL PRODUCT AND METHOD OF USING THE SAME

(71) Applicant: Stoner Incorporated, Quarryville, PA (US)

(72) Inventors: Jared H. Nash, Philadelphia, PA (US); Matthew J. Gilkey, Malvern, PA (US); Jonathan E. Crothers, Lancaster, PA (US); Robert W. Sweger, Willow Street, PA (US); Harry T. Zechman, III, Lancaster, PA (US)

(73) Assignee: Stoner Incorporated, Quarryville, PA (US)

( * ) Notice: Subject to any disclaimer, the term of this patent is extended or adjusted under 35 U.S.C. 154(b) by 0 days.

(21) Appl. No.: 18/397,966

(22) Filed: Dec. 27, 2023

Related U.S. Application Data

(60) Provisional application No. 63/526,764, filed on Jul. 14, 2023.

(51) Int. Cl.

| | |
|---|---|
| ***C11D 1/00*** | (2006.01) |
| ***B08B 3/04*** | (2006.01) |
| ***B08B 3/08*** | (2006.01) |
| ***B08B 7/00*** | (2006.01) |
| ***C11D 1/83*** | (2006.01) |
| ***C11D 3/12*** | (2006.01) |
| ***C11D 3/20*** | (2006.01) |
| ***C11D 3/22*** | (2006.01) |
| ***C11D 3/28*** | (2006.01) |
| ***C11D 3/40*** | (2006.01) |
| ***C11D 3/43*** | (2006.01) |
| ***C11D 3/48*** | (2006.01) |
| *C11D 1/14* | (2006.01) |
| *C11D 1/22* | (2006.01) |
| *C11D 1/72* | (2006.01) |

(52) U.S. Cl.
CPC .................. *C11D 3/28* (2013.01); *B08B 3/08* (2013.01); *B08B 7/0014* (2013.01); *C11D 1/83* (2013.01); *C11D 3/1246* (2013.01); *C11D 3/2086* (2013.01); *C11D 3/225* (2013.01); *C11D 3/40* (2013.01); *C11D 3/48* (2013.01); *C11D 1/146* (2013.01); *C11D 1/22* (2013.01); *C11D 1/72* (2013.01)

(58) Field of Classification Search
CPC ........... C11D 1/00; C11D 3/042; C11D 3/044; C11D 3/20; C11D 3/2068; C11D 3/2075; C11D 3/22; C11D 3/43; B08B 3/04
See application file for complete search history.

(56) References Cited

U.S. PATENT DOCUMENTS

| | | | | |
|---|---|---|---|---|
| 2010/0000579 | A1* | 1/2010 | Reinbold | C11D 3/168 134/34 |
| 2012/0000485 | A1 | 1/2012 | Mizuta et al. | |
| 2013/0319467 | A1 | 12/2013 | Mohs et al. | |
| 2022/0010244 | A1 | 1/2022 | Takeda et al. | |
| 2022/0054379 | A1 | 2/2022 | Monguillon et al. | |

FOREIGN PATENT DOCUMENTS

| | | | |
|---|---|---|---|
| CN | 102364331 | A | 2/2012 |
| JP | 09-241877 | A | 9/1997 |
| JP | 2007-270222 | A | 10/2007 |
| JP | 2013-071111 | A | 4/2013 |
| JP | 2016-011436 | A | 1/2016 |
| JP | 2016-530398 | A | 9/2016 |
| JP | 2017-031267 | A | 2/2017 |
| JP | 2018-044192 | A | 3/2018 |
| JP | 2021-518883 | A | 8/2021 |
| JP | 2021-147660 | A | 9/2021 |
| WO | WO-2017/186791 | A1 | 11/2017 |

OTHER PUBLICATIONS

International Search Report and Written Opinion issued in International Patent Application No. PCT/US2024/012875, dated Jun. 3, 2024.
Notice of Reasons for Rejection issued in Japanese Patent Application No. 2024-000039, dated Mar. 12, 2024.

* cited by examiner

*Primary Examiner* — Brian P Mruk
(74) *Attorney, Agent, or Firm* — Foley & Lardner LLP

(57) ABSTRACT

A composition for removing iron deposits, rust, or metallic particles from a surface, the composition including: at least one reducing agent; at least one chelating agent that changes color upon chelation; and at least one solvent.

6 Claims, No Drawings

IRON, RUST, AND METALLIC DEPOSIT REMOVAL PRODUCT AND METHOD OF USING THE SAME

CROSS-REFERENCE TO RELATED APPLICATION

This application claims priority to U.S. Provisional Patent Application No. 63/526,764, filed on Jul. 14, 2023. The contents of this application are incorporated herein by reference in its entirety.

BACKGROUND

Rust removal products remove iron fallout or small bits of iron and/or rust that are adhered to a surface, such as a vehicle's paint or clear coat. Current rust removal products use thioglycolic acid, thiolactic acid, thiomalic acid, and salts, esters or derivatives thereof, such as sodium thioglycolate, ammonium thioglycolate, sodium mercaptoacetate, mercaptoacetic acid, etc. Thioglycolic acid reduces ferrous iron ($Fe^{3+}$) to ferric iron ($Fe^{2+}$) and chelates the ferric ion to form ferric thioglycolate, which is a dark red/violet compound and clearly visible on the vehicle. However, thioglycolate contains sulfur, which gives the thioglycolate species a strong, unpleasant odor, similar to rotten eggs. As a result, an extremely foul odor and noxious fumes are a known characteristic associated with these iron remover/iron fallout remover products.

There is a need in the art for a rust removal product that does not have a strong, unpleasant odor, and the present disclosure satisfies this need.

SUMMARY OF THE INVENTION

According to one aspect of the present disclosure, a composition for removing iron deposits, rust, or metallic particles is provided, the composition comprising: (a) at least one reducing agent; (b) at least one chelating agent that changes color upon chelation; and (c) at least one solvent.

In another aspect, a composition for removing iron deposits, rust, or metallic particles from a surface is provided, the composition comprising: (a) water; (b) lactic acid; (c) 1,10-phenanthroline; (d) 2-butoxyethanol; (e) sodium metasilicate; (f) at least one preservative; (g) at least one thickening agent; and (h) at least one dye, wherein the composition has a pH from about 5 to about 7.

In one aspect, a method for removing iron, rust and/or metallic particles from a surface is provided, the method comprising: (a) applying a composition to the surface, wherein the composition comprises: (i) at least one reducing agent; (ii) at least one iron chelating agent that changes color upon chelation; and (iii) at least one solvent; (b) allowing the composition to sit on the surface for a period of time, wherein the reducing agent reduces the metallic, iron, or rust particles to form a soluble iron species; and wherein the iron chelating agent binds to the soluble iron species in the solution to form an iron chelate; and (c) rinsing the composition and the soluble metal chelate from the surface, thereby removing the rust, iron, and/or metallic particles from the surface.

In some embodiments, the reducing agent comprises a strong acid, a weak acid, a mild reducing agent, or any combination thereof. In some embodiments, the reducing agent comprises a compound selected from the group consisting of lactic acid, oxalic acid, hydroxylammonium hydrochloride, phosphoric acid, acetic acid, hydrochloric acid, sulfuric acid, citric acid, and any combination thereof.

In some embodiments, the chelating agent comprises a heterocyclic organic compound that changes color upon chelation. In some embodiments, the heterocyclic organic compound changes color to a red color upon chelation. In some embodiments, the heterocyclic organic compound changes color to a pink color upon chelation.

In some embodiments, the heterocyclic organic compound comprises a substituted or unsubstituted phenanthroline, a substituted or unsubstituted bipyridine, or derivatives thereof. In some embodiments, the heterocyclic organic compound includes 1,10-phenanthroline, 2,2'-bipyridine, or derivatives thereof.

In some embodiments, the solvent comprises a polar protic solvent or an aprotic polar solvent. In some embodiments, the solvent comprises water, glycol ether, an alcohol, acetone, or any combination thereof.

In some embodiments, the composition further comprises at least one pH adjusting agent. In some embodiments, the pH adjusting agent comprises an alkaline compound. In some embodiments, the alkaline compound is selected from the group consisting of sodium bicarbonate, potassium hydroxide, sodium metasilicate, and any combination thereof.

In some embodiments, a pH of the composition is from about 3 to about 7. In some embodiments, the pH of the composition is from about 5 to about 7. In some embodiments, the pH of the composition is from about 5 to about 6.

In some embodiments, the composition further comprises at least one thickening agent. In some embodiments, the thickening agent comprises a compound selected from the group consisting of hydroxy ethyl cellulose (HEC) powder, a hydroxypropyl methylcellulose (HPMC) powder, an acrylic acid polymer, xanthan gum, and any combination thereof.

In some embodiments, the composition further comprises at least one surfactant. In some embodiments, the surfactant comprises an ionic surfactant, a non-ionic surfactant, an amphoteric surfactant, or any combination thereof. In some embodiments, the surfactant comprises a primary alcohol ethoxylate, a secondary alcohol ethoxylate, sodium laureth sulfate, cocamidopropyl hydroxysultaine, or any combination thereof. In some embodiments, the surfactant comprises dodecyl benzene sulfonic acid.

In some embodiments, the composition further comprises at least one dye. In some embodiments, the dye changes a color of the composition without affecting the color change of the chelating agent upon chelation. In some embodiments, the dye changes a color of the composition to a color that is different from the color change of the chelating agent upon chelation.

In some embodiments, the composition further comprises at least one preservative. In some embodiments, the preservative comprises a biocide.

In some embodiments, any one of the compositions described herein is free from foul or noxious odors (e.g., unpleasant smell). In some embodiments, any one of the compositions described herein does not have a strong, unpleasant, pungent odor. In some embodiments, the foul or noxious odor is a "rotten egg" or a sulfur odor, similar to hydrogen sulfide gas. In some embodiments, any one of the compositions described herein does not have an unpleasant mercaptan odor.

In some embodiments, the surfactant removes grime, dirt, or soil from the surface.

In some embodiments, the composition is applied to the surface using a spray bottle, spray equipment, or by wiping the composition onto the surface. In some embodiments, the surface is a metal surface. In some embodiments, the surface has a gel coat. In some embodiments, the surface is a clear coat. In some embodiments, the surface is of an object selected from the group consisting of an automobile, a motorcycle, a tool, furniture, appliances, utensils, cookware, fabric, carpet, concrete, ship, boat, watercraft, nuts & bolts, glass substrates. In some embodiments, the surface is an exterior surface or an interior surface of the object.

In some embodiments, the composition is applied to a vertical surface. In some embodiments, the composition is applied to a horizontal surface. In some embodiments, the composition is applied to a surface which is not parallel to a floor.

In some embodiments, the period of time is from about 1 minute to about 1 hour.

Both the foregoing summary and the following detailed description are exemplary and explanatory. They are intended to provide further details of the disclosure, but are not to be construed as limiting. Other objects, advantages, and novel features will be readily apparent to those skilled in the art from the following detailed description of the disclosure.

DETAILED DESCRIPTION

I. Overview

Current rust removal compositions are formulated with thioglycolic acid and derivatives thereof, which produce a strong, typical mercaptan, disagreeable and unpleasant odor that is difficult to mask and eliminate. Other names for thioglycolic acid include mercaptoacetic acid, thiovanic acid, thioglycolic acid, acetomercaptan, mercaptoacetate, 2-mercaptoacetic acid, 2-thioglycolic acid, and thioglycolic acid. The unpleasant mercaptan odor is notably distinguished by a sulfurous and acidic, even rancid, odor combined with a scorched and/or burnt odor. Thioglycolic acid can decompose into hydrogen sulfide ($H_2S$) and other compounds such as highly malodorous light mercaptans. See US Patent Application No. 2022/0054379.

This odor is disturbing when using compositions comprising thioglycolic acid and derivatives thereof, which represents a major drawback with its use, in particular in the rust-removal field. To counter this unpleasant odor, a number of strategies have been employed by manufacturers, including masking the odor of the thioglycolic acid using odor-masking agents, or reducing the release of $H_2S$ and/or of light mercaptans which may be responsible for the odor.

Examples of prior strategies for addressing the noxious odor associated with thioglycolic acid compositions include the use of odor-masking agents of natural substance, natural substance extract or fragrancing base type; adsorbents such as charcoal or zeolites or cyclodextrins which make it possible to reduce the amount of $H_2S$ and/or of light mercaptans released; or specific additives likewise making it possible to reduce the amount of $H_2S$ and/or of light mercaptans released, such as polyphenols or metal oxides. None of these solutions are ideal.

Particularly in the automotive field, it is important to address iron particles. Iron particles are often embedded in the paint coating an automobile (e.g., on wheels and body panels), and can cause rust and other forms of corrosion if left untreated. Dissolving and removing these particles helps to prevent damage to the vehicle's paint and protect its appearance. Iron particles can come from a variety of sources, including brake dust, industrial fallout, and road debris. When these particles come into contact with the surface of a vehicle, they can bond to the paint and create an unsightly rust stain.

In the context of car detailing, $Fe_2O_3$ (iron(III) oxide) may refer to iron particles that have settled on a vehicle's surface, typically as a result of brake dust or other sources of airborne iron particles. These iron particles can cause staining and discoloration on the paint, wheels, and other surfaces of a vehicle if not removed in a timely manner. Removing iron particles can help to prevent damage to the vehicle's paint and finish.

The present invention is directed to compositions and methods for removing iron deposits, rust, or metallic particles from a surface, including but not limited to the surface of an automobile. The compositions described herein do not have the unpleasant odor found in current thioglycolic acid-based formulations. The rust removal compositions of the present invention use at least reducing agent that reduces the ferric iron to the soluble ferrous iron so it can be removed from the surface and at least one chelating agent that chelates the iron. The chelating agents used herein change color upon chelating iron to indicate that the rust removal composition is working.

Use of a rust or iron particle removal composition that does not emit an unpleasant mercaptan order has significant benefits over prior art thioglycolic acid-based formulations. For example, use of thioglycolic acid-based formulations may require significant ventilation and/or respiratory protection, which are not required with use of the compositions described herein. By decoupling the iron chelating agent from the iron reducing agent, specific color changes can also be achieved.

II. Compositions

The rust or iron particle removing compositions described herein comprise: (a) at least one reducing agent; (b) at least one chelating agent that changes color upon chelation; and (c) at least one solvent. Without wishing to limit the present invention to any theory or mechanism, the reducing agent in the composition reduces iron oxide to a soluble iron species, and upon chelation by the chelating agent, a color change is observed to demonstrate that the product is functioning as intended.

In some embodiments, the composition comprises from about 1% to about 50% by weight of the reducing agent. In some embodiments, the composition comprises from about 5% to about 45% by weight of the reducing agent. In some embodiments, the composition comprises from about 10% to about 40% by weight of the reducing agent. In some embodiments, the composition comprises from about 10% to about 30% by weight of the reducing agent. In some embodiments, the composition comprises from about 15% to about 25% by weight of the reducing agent.

In some embodiments, the composition comprises about 1%, about 5%, about 10%, about 15%, about 20%, about 25%, about 30%, about 35%, about 40%, about 45%, or about 50% by weight of the reducing agent. In some embodiments, the composition comprises about 20% by weight of the reducing agent.

In some embodiments, the composition comprises from about 0.01% to about 5% by weight of the chelating agent. In some embodiments, the composition comprises from about 0.1 to about 5% by weight of the chelating agent. In some embodiments, the composition comprises from about 0.1% to about 4% by weight of the chelating agent. In some embodiments, the composition comprises from about 0.1% to about 3% by weight of the chelating agent. In some embodiments, the composition comprises from about 0.1% to about 2% by weight of the chelating agent. In some embodiments, the composition comprises from about 0.1% to about 2% by weight of the chelating agent. In some embodiments, the composition comprises from about 0.1% to about 0.5% by weight of the chelating agent.

In some embodiments, the composition comprises about 0.01%, about 0.1%, about 0.25%, about 0.5%, about 1%, about 2%, about 3%, about 4%, or about 5% by weight of the chelating agent. In some embodiments, the composition comprises about 0.25% by weight of the chelating agent.

In some embodiments, the composition further comprises surfactants and solvents to provide cleaning power to remove grime and dirt from the surface. In some embodiments, the surfactant comprises an ionic surfactant, a non-ionic surfactant, an amphoteric surfactant, or any combination thereof. In some embodiments, the ionic surfactant comprises a cationic and/or an anionic surfactant. In some embodiments, the surfactant comprises a primary alcohol ethoxylate, a secondary alcohol ethoxylate, sodium laureth sulfate, cocamidopropyl hydroxysultaine, or any combination thereof. In some embodiments, the surfactant comprises dodecyl benzene sulfonic acid.

In some embodiments, the solvent comprises a polar protic solvent or an aprotic polar solvent. In some embodiments, the solvent comprises water, glycol ether, an alcohol, acetone, or any combination thereof. In some embodiments, the solvent comprises water. In some embodiments, the solvent comprises 2-butoxyethanol. In some embodiments, the solvent comprises water and 2-butoxyethanol.

In some embodiments, the reducing agent comprises a strong acid, a weak acid, a mild reducing agent, or any combination thereof. Suitable reducing agents that may be used in the compositions described herein include but are not limited to lactic acid, oxalic acid, hydroxylammonium hydrochloride, phosphoric acid, acetic acid, hydrochloric acid, sulfuric acid, citric acid, and any combination thereof. In some embodiments, the reducing agent is lactic acid. One benefit of using lactic acid in the compositions of the present invention is that it is less toxic and less hazardous than thioglycolic acid.

In some embodiments, the chelating agent comprises a heterocyclic organic compound. In some embodiments, the chelating agent acts as an indicator to show that the product is removing the iron deposits, rust, or metallic particles. The heterocyclic organic compound may change color to a red color upon chelation. The heterocyclic organic compound may change color to a pink color upon chelation.

In some embodiments, the heterocyclic organic compound comprises a substituted or unsubstituted phenanthroline, a substituted or unsubstituted bipyridine, or derivatives thereof. As used herein, "substituted" or "derivatives thereof" may refer to compounds that comprise one or more alkyl, alkenyl, alkynyl, cycloalkyl, aryl, halo, hydroxyl, oxy, alkoxy, amino, ester, or carboxyl substituents. In some embodiments, the heterocyclic organic compound is 1,10-phenanthroline.

In some embodiments, the composition further comprises at least one dye. Suitable dyes for use in the composition are inert and do not interact or react with any component of the composition. In some embodiments, the dye changes a color of the composition without affecting a color change of the chelating agent upon chelation. In some embodiments, the dye changes a color of the composition to a color different than a color change of the chelating agent upon chelation. In some embodiments, the dye is a blue or turquoise dye. Suitable dyes for use in the composition include, but are not limited to, FD&C Blue No. 1, FD&C Blue No. 2, FD&C Blue No. 4, Acid Blue 1, and Orcoterge Turquoise DG-ST.

(In some embodiments, the pH of the composition is from about 3 to about 7. In some embodiments, the pH of the composition is from about 5 to about 7. In some embodiments, the pH of the composition is from about 5 to about 6. In some embodiments, the pH of the composition is about 3, about 4, about 5, about 6, or about 7.

To adjust the pH, at least one pH adjusting agent may be used. In some embodiments, the pH adjusting agent comprises an alkaline compound. Suitable alkaline compounds for use in the composition include, but are not limited to, sodium bicarbonate, potassium hydroxide, sodium metasilicate, and any combination thereof. In some embodiments, the pH adjusting agent comprises sodium metasilicate.

Additionally, the viscosity of the composition may be adjusted to improve the cling or adherence of the composition to the surface, and to prevent excessive runoff of the sprayed or applied product. Any thickening agent suitable for weakly acidic solutions can be used, such as hydroxy ethyl cellulose (HEC) powders, hydroxypropyl methylcellulose (HPMC) powders, acrylic acid polymers, xanthan gum, and any combination thereof.

In some embodiments, the composition further comprises a preservative. In some embodiments, the preservative is a biocide. Suitable preservatives include, but are not limited to, sodium benzoate, potassium sorbate, DMDM hydantoin, methylisothiazolinone, Kathon-LX 1.5, Nuosept 95, diazolidinyl urea, and parabens.

In some embodiments, the composition comprises: (a) water; (b) lactic acid; (c) 1,10-phenanthroline; (d) 2-butoxyethanol; (e) sodium metasilicate; (f) at least one preservative; (g) at least one thickening agent; and (h) at least one dye. Further, the composition can have a pH of from about 5 to about 7.

The compositions of the present invention do not exhibit the strong, unpleasant, pungent, mercaptan odor that is present in current rust removal compositions. In some embodiments, the composition is free from foul or noxious odors. In some embodiments, the composition does not emit an odor that can be irritating to the nose and/or throat, such as a "rotten egg", mercaptan, or sulfur odor. In some embodiments, the composition is free from thioglycolic acid or salts thereof. In some embodiments, the composition comprises less than about 0.005 ppm, less than about 0.004 ppm, less than about 0.003 ppm, less than about 0.002 ppm, less than about 0.001 ppm, or less than about 0.0005 of a mercaptan.

III. Methods

To manufacture the composition, the components are mixed, ensuring that all of the solids have dissolved.

The compositions described herein are used to remove iron, rust and/or metallic particles from a surface. In some embodiments, methods for removing iron, rust and/or metallic particles from a surface comprise: (a) applying any one of the compositions described herein to a surface; (b) allowing the mixture to sit on the surface for a period of time, wherein the reducing agent reduces the metallic, iron, or rust particles to form a soluble iron species; and wherein the chelating agent binds to the soluble iron species in the solution to form an iron chelate; and (c) rinsing or removing the mixture and the iron chelate from the surface, thereby removing rust, iron, and/or metallic particles from the surface.

The composition can be applied in a variety of ways to a surface, including but not limited to, spraying using a trigger bottle or spray equipment, or being brushed, rolled or wiped onto the surface.

In some embodiments, the surface is a fabric, concrete, marble, other types of stone and masonry, plastic, copper, iron, rubber, aluminum, steel, brick, stucco, chrome, metal, porcelain, fiberglass, colorfast fabrics, carpeting, or an iron-containing surface. The surface can be of an object selected from the group consisting of an automobile, a motorcycle, a tool, furniture, appliances, utensils, cookware, fabric, carpet, concrete, ship, boat, watercraft, nuts & bolts, glass substrates, automotive metal parts, household metal parts, industrial-grade metal parts, tractors, antiques, farm equipment & implements, trailers & hitches, marine application, septic systems and piping, and household surfaces. In some embodiments, the surface is a metal surface. In some embodiments, the surface has a gel coat. In some embodiments, the surface is a clear coat. In some embodiments, the surface is an exterior surface or an interior surface of the object. In some embodiments, the surface is an automobile.

In some embodiments, the composition is left on the surface for a period of time from about 1 minute to about 1 hour. In some embodiments, the composition is left on the surface for about 1 minute, about 5 minutes, about 10 minutes, about 15 minutes, about 20 minutes, about 30 minutes, about 40 minutes, about 50 minutes, or about 60 minutes.

IV. Definitions

As used herein, “about” will be understood by persons of ordinary skill in the art and will vary to some extent depending upon the context in which it is used. If there are uses of the term which are not clear to persons of ordinary skill in the art, given the context in which it is used, “about” will mean up to plus or minus 10% of the particular term.

The use of the terms “a” and “an” and “the” and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the embodiments and does not pose a limitation on the scope of the claims unless otherwise stated. No language in the specification should be construed as indicating any non-claimed element as essential.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The present invention, thus generally described, will be understood more readily by reference to the following examples, which are provided by way of illustration and are not intended to be limiting of the present invention.

EXAMPLES

While certain embodiments have been illustrated and described, it should be understood that changes and modifications can be made therein in accordance with ordinary skill in the art without departing from the technology in its broader aspects as defined in the following claims.

Example 1

An embodiment of the rust removal composition comprises 50-70% by weight water, 15-20% by weight lactic acid, 0.01-0.5% by weight 1,10 phenanthroline, 1-5% by weight linear alcohol ethoxylate, 1-5% by weight sodium laureth sulfate, 1-5% by weight dodecylbenzenesulfonic acid, 1-5% by weight Mackam CBS 50G, 1-5% by weight glycol ether DB, 0.001-0.1% by weight hydroxypropyl methylcellulose, 0.001-0.1% by weight sodium metasilicate, 0.001-0.1% by weight Nuosept 95, and 0.0001-0.1% by weight Orcoterge Turquoise DG-ST.

Example 2

The rust removal composition of Example 1 may be used to remove rust from a surface of an automobile. The composition is sprayed onto the surface of the automobile and is allowed to sit on the surface for about 1 hour. During this time, the lactic acid reduces the iron (III) in the rust to iron (II), and the 1,10 phenanthroline binds the iron (II), forming an iron chelate. A color change occurs during this time, indicating that the 1,10 phenanthroline binds to the iron (II), forming a red compound. After 1 hour, the composition is rinsed from the automobile surface, and no foul, unpleasant odor is present from the composition.

The embodiments, illustratively described herein may suitably be practiced in the absence of any element or elements, limitation or limitations, not specifically disclosed herein. Thus, for example, the terms “comprising,” “including,” “containing,” etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase “consisting essentially of” will be understood to include those elements specifically recited and those additional elements that do not materially affect the basic and novel characteristics of the claimed technology. The phrase “consisting of” excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range comprises each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition for removing iron deposits, rust, or metallic particles, the composition comprising:
(a) water
(b) lactic acid;
(c) 1,10-phenanthroline;
(d) 2-butoxyethanol;
(e) sodium metasilicate;
(f) at least one preservative;
(g) at least one thickening agent; and
(h) at least one dye;
wherein the composition has a pH from about 5 to about 7.

2. The composition of claim 1, wherein the at least one thickening agent is selected from the group consisting of a hydroxy ethyl cellulose (HEC) powder, a hydroxypropyl methylcellulose (HPMC) powder, an acrylic acid polymer, xanthan gum, and any combination thereof.

3. The composition of claim 1, further comprising at least one surfactant selected from the group consisting of a primary alcohol ethoxylate, a secondary alcohol ethoxylate, dodecyl benzene sulfonic acid, cocamidopropyl hydroxysultaine, and any combination thereof.

4. A method for removing iron, rust and/or metallic particles from a surface, the method comprising:
(a) applying a composition to the surface, wherein the composition comprises:
(i) at least one reducing agent;
(ii) at least one chelating agent that changes color upon chelation;
(iii) at least one solvent; and
(b) allowing the composition to sit on the surface for a period of time, wherein the reducing agent reduces the metallic, iron, or rust particles to form a soluble iron species; and wherein the chelating agent binds to the soluble iron species in the solution to form an iron chelate; and
(c) rinsing the composition and the iron chelate from the surface, thereby removing rust, iron, and/or metallic particles from the surface,
wherein the composition further comprises:
(a) at least one thickening agent;
(b) at least one surfactant; and
(c) at least one preservative.

5. The method of claim 4, wherein:
(a) the thickening agent is selected from the group consisting of a hydroxy ethyl cellulose (HEC) powder, a hydroxypropyl methylcellulose (HPMC) powder, an acrylic acid polymer, xanthan gum, and any combination thereof,
(b) the surfactant removes grime, dirt, or soil from the surface;
(c) the at least one surfactant is selected from the group consisting of a primary alcohol ethoxylate, a secondary alcohol ethoxylate, dodecyl benzene sulfonic acid, and any combination thereof, or
(d) any combination of (a), (b), and/or (c).

6. A method for removing iron, rust and/or metallic particles from a surface, the method comprising:
(a) applying a composition to the surface, wherein the composition comprises:
(i) at least one reducing agent;
(ii) at least one chelating agent that changes color upon chelation;
(iii) at least one solvent; and
(b) allowing the composition to sit on the surface for a period of time, wherein the reducing agent reduces the metallic, iron, or rust particles to form a soluble iron species; and
wherein the chelating agent binds to the soluble iron species in the solution to form an iron chelate; and
(c) rinsing the composition and the iron chelate from the surface, thereby removing rust, iron, and/or metallic particles from the surface,
wherein the composition has a pH from about 5 to about 7.

* * * * *